United States Patent Office 3,740,200
Patented June 19, 1973

3,740,200
PROCESS FOR EXTRACTING URANIUM FROM ITS ORES
René Gautier, La Madeleine, France, assignor to Ugine Kuhlmann, Paris, France
Filed Oct. 20, 1970, Ser. No. 82,498
Claims priority, application France, Oct. 22, 1969, 6936271
Int. Cl. C01g 43/00
U.S. Cl. 423—6                                21 Claims

ABSTRACT OF THE DISCLOSURE

Uranium is extracted from its ore by reacting said ore with ammonium bisulfate thereby forming a composition containing uranium sulfate, extracting said sulfate from the composition and regenerating and recycling the ammonium bisulfate for further use in leaching the ore.

BACKGROUND OF THE INVENTION

Figure 1:
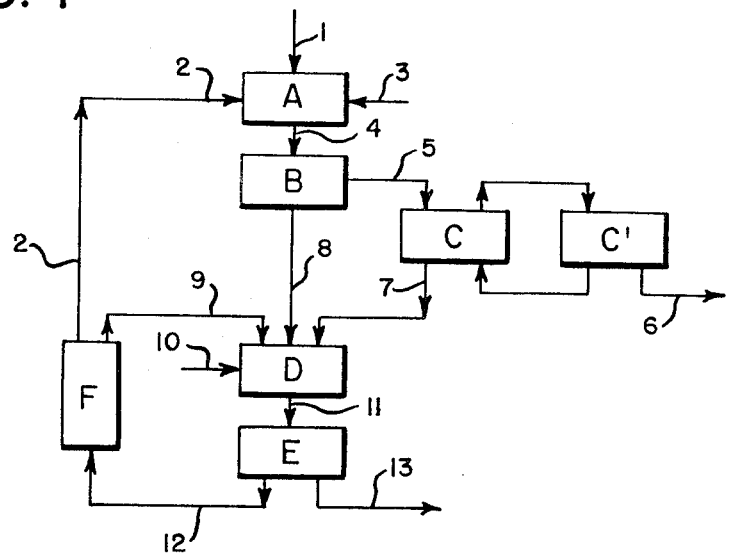

In a known process, uranium is extracted from its ore by means of an acid leaching agent, which for technical as well as economic reasons is usually sulfuric acid. When used with an oxidizing agent, all of the uranium is solubilized in the form of its uranyl sulphate ($UO_2SO_4$) salt which is then extracted from the leaching liquor and further processed to yield the metal. One of the serious limitations of acid leaching lies in the nature of the gangue materials present in the uranium bearing ore; if they are largely alkaline, acid consumption will be prohibitive. Accordingly alkaline leaching will, in these circumstances, be the preferred method. However, alkaline leaching has the objection that recovery of uranium frequently is not as efficient as when carried out with acid leaching.

The present invention has successfully overcome these drawbacks in eliminating excessive loss of leaching agent while at the same time achieving a high level yield of uranium.

SUMMARY OF THE INVENTION

One embodiment of the present invention relates to a process for extracting uranium from its ore by reacting the ore with ammonium bisulfate. The reaction results in the formation of a composition containing ammonium sulfate, insoluble and soluble metal sulfates and soluble uranium sulfate. The slurry is filtered to remove the insoluble metal sulfates and unreacted ore which are then washed. The uranium sulfate is then selectively extracted from this filtrate. The insoluble metal sulfates are returned to the uranium-free liquid phase to which are added ammonia and carbon dioxide or a substance containing carbon dioxide in order to form, in addition to ammonium sulfate, the insoluble metal hydroxides and carbonates of the soluble and insoluble sulfates present therein. The insolubles are filtered and the filtrate, a solution consisting essentially of ammonium sulfate is evaporated thereby leaving crystalline ammonium sulfate which is then heated to 250–320° C. thereby regenerating the ammonium bisulfate in addition to ammonia for further use in leaching the ore. Thus, the only reactant which is lost in the process of this invention is that which combines chemically with the uranium present in the ore and the excess reactant is eventually reused for further leaching of the ore.

In an advantageous alternative embodiment, the ore is heated with ammonium bisulfate in the dry state at a temperature between 200 and 320° C. If the temperature is maintained in excess of 250° C., ammonium sulfate may be employed as it decomposes at this temperature to form ammonium bisulfate and ammonia. Water is then added to the dry reaction mass to form a slurry which is further processed as above.

In either of the above embodiments, ammonia and an excess of carbon dioxide may be advantageously reacted with the slurry containing ammonium sulfate, uranium sulfate and other metal sulfates to form soluble ammonium uranyl carbonate and insoluble metal hydroxides and carbonates. After separation of the insolubles, recovery of the ammonium uranyl carbonate may be accomplished, for example, by heating the filtrate at a temperature sufficient to decomplex ammonia uranyl carbonate to form insoluble uranyl hydroxide or uranyl carbonate which may be removed, for example, by filtration.

DETAILED DESCRIPTION OF THE INVENTION

In the first embodiment, crushed uranium ore is combined with water and ammonium bisulfate and the slurry is heated at a sufficient temperature and for a sufficient time to convert the uranium in the ore to uranium sulfate.

The amount of ammonium bisulfate required for the reaction will depend upon the composition of the ore and may be calculated in advance by considering the quantity of sulfates which a particular lot of ore will yield after reaction with the bisulfate. The preferred quantity of ammonium bisulfate is generally close to the stoichiometric amount but the reaction may proceed effectively with the use of even a smaller quantity of bisulfate.

Leaching can be carried out either in an aqueous medium at a temperature at or about the boiling point of the leaching medium, or in the alternative, in the dry state at a temperature between 200–320° C. If the reaction takes place in the dry state and the temperature is maintained in excess of 250° C., ammonium sulfate may be used as it will decompose at this temperature forming ammonium bisulfate and ammonia. The bisulfate so formed will then be available for the reaction with the uranium and the ammonia can also be utilized in the subsequent process step as hereinafter described. Water is then added to the dry reaction product to form a slurry.

As a result of the reaction, ammonium sulfate and the sulfates of the metals contained in the ore which are subject to the reaction with the bisulfate are formed. These sulfates may include, in addition to the uranyl and uranous sulfate the sulfates of other ore components such as calcium, aluminum and iron.

The soluble uranium sulfates may be recovered directly from the slurry by conventional and known means such as ion exchange resins, or the slurry may be filtered to remove insoluble metal sulfates and the soluble uranium sulfates may be recovered from the liquid phase by conventional means such as by known ion exchange resins, solvents and chemical or electrochemical precipitants.

The uranium-free liquid phase, including any previously filtered insoluble sulfates, is then subjected to reaction with ammonia to form insoluble hydroxides according to the following equations:

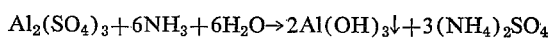

$Al_2(SO_4)_3 + 6NH_3 + 6H_2O \rightarrow 2Al(OH)_3\downarrow + 3(NH_4)_2SO_4$

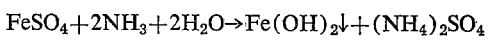

$FeSO_4 + 2NH_3 + 2H_2O \rightarrow Fe(OH)_2\downarrow + (NH_4)_2SO_4$

However, if other metal sulfates are present, ammonia and carbon dioxide or a substance which releases carbon dioxide may be advantageously used to form insoluble (carbonate) precipitates such as shown in the following equation:

$CaSO_4 + CO_2 + H_2O + 2NH_3 \rightarrow CaCO_3\downarrow + (NH_4)_2SO_4$

The liquid phase containing the soluble ammonium sulfate is then separated from the hydroxides and carbonates by suitable means such as filtration. The resulting ammonium sulfate solution is treated by evaporation, for example, to yield crystalline ammonium sulfate which can be decomposed by heating at 250–320° C. according to the following reaction:

$$(NH_4)_2SO_4 \rightarrow NH_4HSO_4 + NH_3$$

Both the ammonium bisulfate and ammonia resulting from this reaction can be recycled for further use.

In another embodiment of this invention, ammonia and an excess of carbon dioxide may be reacted with the acid slurry containing ammonium sulfate, uranium sulfate and other metal sulfate salts to form soluble ammonium uranyl carbonate and insoluble metal hydroxides and carbonates. This reaction may be carried out upon completion of the reaction of the ore with ammonium bisulfate and separation of the insolubles or may be advantageously carried out immediately after with the latter reaction without separation of the insolubles. After filtration of the insolubles, ammonium uranyl carbonate may be recovered by conventional means, for example, by heating at a temperature sufficient to decomplex the ammonium uranyl carbonate to form insoluble uranyl hydroxides or uranyl carbonate which may be removed, for example, by filtration.

Figure 2:
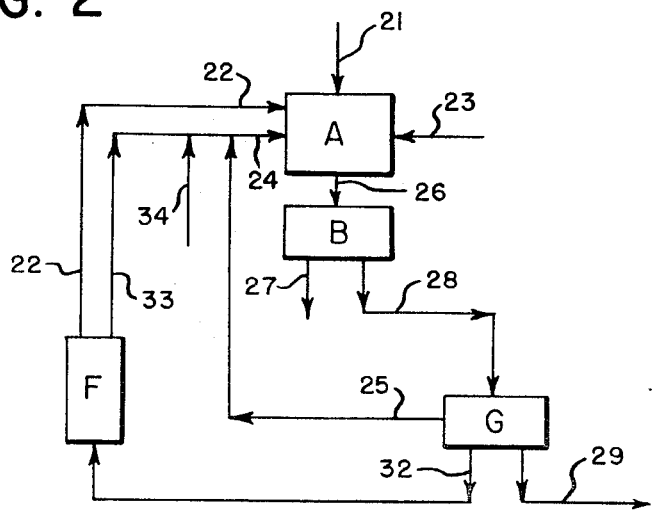

The invention will now be described in connection with the accompanying drawings, in which FIGS. 1 and 2 are diagrammatic flow sheets illustrating recovery of the uranium according to alternate embodiments of the invention.

In FIG. 1, A represents a vessel where the reaction of ore with ammonium bisulfate is carried out. Crushed ore is introduced through 1, ammonium bisulfate through conduit 2 and water through conduit 3. This slurry is then heated at or about its boiling point until such time as the reaction is complete or substantially complete. The slurry is then conveyed through conduit 4 to filtration apparatus B where the insolubles are filtered and washed. The filtrate, which now contains mainly ammonium sulfate and soluble metal sulfates including the uranium sulfates is conveyed through conduit 5 to a conventional extraction-regeneration apparatus (C—C'). The uranium sulfates are extracted by known means and withdrawn through conduit 6. The uranium-free liquor is conveyed through conduit 7 into a reactor D. The washed insoluble filtered at B are also conveyed to D through conduit 8. Ammonia is introduced into D through conduit 9, and $CO_2$ or a substance readily capable of releasing $CO_2$, e.g., a carbonate or ammonium bicarbonate solution, is introduced through conduit 10. The slurry formed in D is conveyed through conduit 11 to filtration apparatus E where the insoluble hydroxides, carbonates and other insoluble salts of the ore are filtered, washed and withdrawn at 13. The filtrate, consisting essentially of an ammonium sulfate solution is conveyed through conduit 12 to evaporator F in which solid ammonium sulfate is produced. The thermal decomposition of the solid ammonium sulfate can take place in a separate reactor (not shown) but is advantageously carried out in the evaporator 12, by heating the ammonium sulfate at about 250° to 320° C. to form ammonium bisulfate which is recycled through conduit 2 and ammonia which is recycled through conduit 9. The uranium-free liquid may be advantageously employed to wash the insolubles present in B.

In a second embodiment as illustrated in FIG. 2, A represents a two stage reactor where the reaction of the ore with ammonium bisulfate is carried out in the first stage. Crushed ore is introduced through conduit 21, ammonium bisulfate through conduit 22 and water through conduit 23. Ammonia and excess of $CO_2$ or a substance readily capable of releasing $CO_2$ are introduced in the second stage through conduit 24 where formation of ammonium sulfate, insoluble metal hydroxides and metal carbonates and soluble ammonium uranyl carbonate takes place. This slurry is conveyed through conduit 26 to filtration apparatus B where the insolubles are filtered, washed and withdrawn through 27 and the filtrate containing ammonium sulfate and ammonium uranyl carbonate is conveyed through conduit 28 to a conventional extraction apparatus G. Extraction is accomplished, for example, by heating the filtrate at a temperature sufficient to decomplex ammonium uranyl carbonate to form insoluble uranyl hydroxide or uranyl carbonate which after filtration is extracted through 29 and further processed by known and conventional methods to yield metallic uranium. This reaction releases excess $NH_3$ and $CO_2$ which are recycled through conduit 25 to vessel A. The residual liquid, consisting essentially of an ammonium sulfate solution, is conveyed through conduit 32 to evaporator F wherein the solid ammonium sulphate is recovered and thermally decomposed as described above. The resulting ammonia and ammonium bisulfate are respectively recycled through conduits 33 and 22 to reactor A.

This embodiment possesses the advantage of greater simplicity and reduces the quantity of water to be evaporated from the ammonium sulfate solution. The $CO_2$ gas utilized in these processes can be conveniently provided by the fuel which produces the plant's thermal energy requirements. If the fuel contains sulfur, it is advantageous to recover in the ammonia medium the $SO_2$ thus formed and catalytically oxidize the sulfite to ammonium sulfate, which is eventually converted to ammonium bisulfate, thereby partly compensating for loss of some of the leaching agent.

The following examples utilized the three types of ores; the granitic and those containing phosphates and carbonates.

Example 1

100 kg. of a granitic ore containing about 96.4% siliceous materials incapable of being leached by acid, 0.126% uranium, 1.2% soluble iron oxide, 1.8% aluminum oxide and 0.4% lime was crushed into a pulp with 50 kg. water. 20 kg. of ammonium bisulfate and 1 kg. ammonium persulfate were added to this slurry. The sodium bisulfate was obtained from the decomposition of 22.9 kg. of ammonium sulfate and which also liberated 2.9 kg. ammonia. The temperature of the slurry was increased to the boiling point and maintained for 2 hours. 94.6 kg. of a solid containing 0.0065% of unreacted uranium, i.e., 5.4% of the uranium originally present, and 73.6 kg. of acid slurry were obtained.

Two methods were utilized to extract the uranium sulfates:

Method A.—The acid slurry was filtered and washed with 100 kg. of water in a two stage rotary filter yielding 124.6 kg. of an acid solution containing 0.12 kg. uranium in the form of its soluble uranyl sulfate salt.

The uranyl sulfate was easily extracted by means of a strong anionic resin and the uranium recovered by known means. After this extraction, 2.9 kg. of ammonia in aqueous solution which combined with a part of the $CO_2$ obtained from fuel combustion was injected into the uranium-free liquor thereby precipitating iron hydroxide, aluminum hydroxide and calcium carbonate. After filtration and washing of the insolubles with 10 kg. of water; 114.6 kg. of solution containing 23.1 kg. ammonium sulfate was recovered.

Method B.—The acid slurry was neutralized with 2.9 kg. of ammonia in aqueous solution in which there was present moreover, 1 kg. $NH_3$ and 2 kg. $CO_2$ in excess of that required for neutralization. The ammonia precipitated the hydroxides of iron and aluminum and in the presence of $CO_2$, insoluble calcium carbonate was formed. The uranium was present as a soluble ammonium uranyl carbonate complex. The alkaline slurry was filtered in a two stage rotary filter with 10 kg. of water, and the solids washed. 122.5 kg. of a solution containing 0.12 kg. uranium was obtained. The $CO_2$ and $NH_3$ were boiled out of the solution and 0.182 kg. of insoluble salts containing 65% uranium was obtained.

Example 2

Following the same procedure as set forth in Example 1, the reaction of the same ore with ammonium bisulfate was conducted in the presence of 0.8 kg. of sodium hydrosulfite together with the reducing elements in the ore. The uranium was converted into uranous sulfate. After extracting the uranous sulfate according to method of washing A of Example 1, sodium pyrophosphate ($Na_4P_2O_7$) was added after partial neutralization of the uranium sulfate solution by ammonia. The resulting precipitate of uranous pyrophosphate was filtered and the filtrate reacted with $NH_3$ and $CO_2$ in order to precipitate iron and aluminum hydroxides and calcium carbonate and recover the ammonium sulfate.

Example 3

A uranium ore containing 0.182% uranium, 64.3% siliceous material incapable of being reacted with acid, 28.2% calcium carbonate, 4.2% alumina and 3.0% ion oxide.

100 kg. of the ore were crushed into a pulp together with 100 kg. of water and 80 kg. of ammonium bisulfate and 1 kg. ammonium persulfate added thereto. The ammonium bisulfate was obtained from the decomposition of 91.8 kg. of ammonium sulfate. The slurry also contained an anti-foaming agent in order to avoid overflowing which might otherwise result from the release of $CO_2$ gas. The slurry was then heated to near the boiling point and held at this temperature until the reaction was completed (about 2 hours). After the reaction had been completed, the slurry was agitated for 2 hours and at the same time permitted to cool. 96.8 kg. of insoluble ore and sulfates and 80.8 kg. of an acid slurry were obtained. The $CO_2$ which had been liberated by the process was reabsorbed by the ammonia recovery unit. Two methods were employed for the extraction of the uranium sulfate, the second one being more advantageous for commercial use.

Method A.—The acid slurry was filtered in a two stage rotary, filtered and washed with 100 kg. of water. 188.5 kg. of a solution containing 0.1739 kg. of uranium were thus obtained. The uranium, present in its uranyl form, was conveniently extracted utilizing known techniques as described above.

After the extraction had been completed, the requisite amounts of $NH_3$ and $CO_2$ were injected into the uranium-free liquid phase to a pH of about 8 and the lime and other soluble sulfates were precipitated. The decanted precipitate was then combined with the insolubles which previously had been filtered and to these solids, 50 kg. of water, $NH_3$ and $CO_2$ were added and the reaction medium maintained for about 8 hours at 60° C. in order to bring about the recovery of ammonium sulfate according to the reaction;

$$CaSO_4 + 2NH_3 + CO_2 + H_2O \rightarrow CaCO_3 + (NH_4)_2SO_4$$

The precipitate thus obtained was filtered, washed and the filtrates containing ammonium sulfate were combined, the water evaporated and 80 kg. of solid or ammonium sulfate obtained.

Method B.—In this embodiment the acid slurry was directly charged with 11.8 kg. of ammonia and the carbon dioxide which was liberated by the reaction of the ore with ammonium bisulfate. 3 kg. of carbon dioxide, 1.5 kg. of excess ammonia and 100 kg. of additional water were then added. The slurry was then agitated at about 65° C. for 10 hours and the insolubles formed thereby were filtered therefrom and washed with 100 kg. of water. 282.5 kg. of a filtrate solution containing 0.1735 kg. of uranium was obtained. After boiling followed by concentrating, the uranium and the ammonium sulfate were recovered in the same manner as shown in the previous examples. 0.3 kg. of a precipitate containing 57% uranium was obtained. The uranium present as its carbonate salt can also be recovered with known ion exchange resins.

Example 4

10 kg. of a uranium ore containing 0.3% uranium, 28% $P_2O_5$, 39% lime and inert materials were mixed with 10 kg. of water and 13 kg. of ammonium bisulfate to form a slurry. The ammonium bisulfate was obtained from the decomposition of 15 kg. of ammonium sulfate with the simultaneous production of 2 kg. of ammonia. The temperature was raised to 100° C. and maintained for 2 hours. The following methods were then utilized for extracting uranium from the resulting slurry.

Method A.—The insolubles were filtered and the soluble uranium salts were recovered on an anionic resin. The uranium-free liquid was then mixed with the filtered solid to extract the entire amount of uranium therein present, the mixture filtered and the filtrate treated with an anionic resin as described above. After complete recovery of the uranium salts on the resin, the liquid and the solid together were reacted with the 2 kg. of $NH_3$ and at the end of the reaction, $CO_2$ gas was injected into the slurry to precipitate the calcium in the form of its carbonate. 0.85 kg. was fixed.

The solids were filtered, washed with 20 kg. of water and a 35 kg. solution obtained which contained 15 kg. of ammonium sulfate which was subsequently recovered in the solid state by evaporation. The resin was regenerated by washing with a chloride, in the conventional manner, producing a solution containing the uranium and 27.5 g. of uranium were precipitated from the solution with sodium hydroxide.

Method B.—The insolubles were filtered and the filtrate was replaced with a solution of ammonium bisulfate in the requisite amount and the process repeated to remove any remaining uranium from the solids and again filtered. The filtrates were then combined and the solution thus obtained containing 28.70 g. of the uranium was neutralized in order to precipitate a mixture of phosphates including ammonium uranyl phosphate. The metal content of this filtered and washed precipitate was 32%. The reactivity of the uranium salt rendered it suitable for high purification by known methods.

I claim:

1. A process for extracting uranium from its ore which comprises reacting the ore with ammonium bisulfate to form a composition containing ammonium sulfate, uranium sulfate and other metal sulfate salts, recovering the uranium sulfate from an aqueous medium containing the same, reacting the remaining metal sulfate salts in aqueous medium with ammonia to form insoluble hydroxides and soluble ammonium sulfate or ammonia and carbon dioxide to form a mixture of insoluble hydroxides and carbonates and soluble ammonium sulfate, eliminating the hydroxides, carbonates and unreacted ore, recovering the ammonium sulfate and thermally decomposing the ammonium sulfate into ammonium bisulfate and ammonia for reuse in the process.

2. A process for extracting uranium from its ore which comprises reacting the ore with ammonium bisulfate in an aqueous medium to form a slurry containing ammonium sulfate, uranium sulfate and other metal sulfate salts, recovering the uranium sulfate soluble in the liquid phase of the slurry, reacting the sulfate salts present in the uranium-free liquid phase with ammonia and carbon dioxide to form the insoluble hydroxides and carbonates thereof and ammonium sulfate, eliminating the insolubles thereby leaving a solution consisting essentially of ammonium sulfate, recovering the ammonium sulfate from the solution, thermally decomposing the ammonium sulfate into ammonium bisulfate and ammonia and recycling the ammonium bisulfate and ammonia for reuse in the process.

3. The process of the claim 2 wherein the reaction with ammonium bisulfate is carried out at or above the boiling temperature of the reaction medium.

4. The process of claim 2 wherein the ammonium bisulfate is present in approximately stoichiometric amount with reactive cations.

5. The process of claim 2 wherein the ammonium bisulfate is present in less than stoichiometric amount.

6. The process of claim 2 wherein the uranium sulfate is extracted directly in the slurry.

7. The process of claim 6 wherein the extraction agent is an anionic exchange resin.

8. The process of claim 2 wherein the uranium sulfate containing solution is separated from the solids contained in the slurry and the uranium sulfate is recovered from the separated liquid phase of the slurry.

9. The process of claim 8 wherein the recovery agent is an anionic exchange resin, solvent, or chemical or electrochemical precipitant.

10. The process according to claim 9 wherein the separated solution is reduced and neutralized to permit precipitation of uranous sulfate by sodium pyrophosphate, and adding sodium pyrophosphate thereto to precipitate the uranium.

11. The process according to claim 2 wherein the carbon dioxide is supplied in the form of another compound readily capable of yielding carbon dioxide.

12. The process according to claim 2 wherein the ammonium sulfate is removed from the solution by evaporation.

13. A process for extracting uranium from its ore which comprises reacting the ore with ammonium bisulfate in the dry state between 200–320° C., adding water to the dry reaction mass to form a slurry containing ammonium sulfate, uranium sulfate and other metal sulfate salts, recovering the uranium sulfate soluble in the liquid phase of the slurry, reacting the sulfate salts present in the uranium-free liquid phase with ammonia and carbon dioxide to form the insoluble hydroxides and carbonates thereof and ammonium sulfate, eliminating the insolubles thereby leaving a solution consisting essentially of ammonium sulfate, recovering the ammonium sulfate from the solution, thermally decomposing the ammonium sulfate into ammonium bisulfate and ammonia and recycling the ammonia bisulfate and ammonia for reuse in the process.

14. The process of claim 13 wherein ammonium sulfate is added to the ore in place of the bisulfate and the reaction temperature is maintained in excess of 250° C. for a sufficient time to convert the ammonium sulfate to ammonium bisulfate and ammonia.

15. The process for extracting uranium from its ore which comprises reacting the ore with ammonium bisulfate in an aqueous medium to form a slurry containing ammonium sulfate, uranium sulfate and other metal sulfate salts, reacting the uranium sulfate and other metal sulfate salts with an excess of ammonia and an excess of carbon dioxide thereby forming soluble ammonium uranyl carbonate and insoluble metal hydroxides and carbonates, eliminating the insolubles, recovering the ammonium uranyl carbonate from the filtrate thereby leaving a solution containing ammonium sulfate, recovering the ammonium sulfate from the solution, thermally decomposing the ammonium sulfate into ammonium bisulfate and ammonia and recycling the ammonia bisulfate and ammonia for reuse in the process.

16. The process of claim 15 wherein ammonium bisulfate and ammonia are formed in situ by the decomposition of ammonium sulfate at a temperature in excess of 250° C., the ammonium bisulfate reacting with the ore in the dry state between 200–320° C., and water being added to form the slurry.

17. The process of claim 15 in which the insolubles are separated before reacting the uranium sulfate and other metal sulfate salts with ammonia and carbon dioxide.

18. The process of claim 15 or 17 wherein the ammonium uranyl carbonate is extracted by heating at a temperature sufficient to decomplex ammonium uranyl carbonate to insoluble uranyl hydroxide or uranyl carbonate resulting in the release of carbon dioxide and ammonia.

19. The process of claim 18 wherein the carbon dioxide and ammonia are recycled.

20. The process of claim 15 or 17 wherein the ammonium uranyl carbonate is extracted by ion exchange resin.

21. The process of claim 6 wherein the extraction agent is a solvent.

References Cited

UNITED STATES PATENTS

| | | | |
|---|---|---|---|
| 3,152,862 | 10/1964 | Fischer | 23—319 |
| 2,926,992 | 3/1960 | Stedman | 23—323 |
| 2,885,270 | 5/1959 | Karcher et al. | 23—319 X |
| 2,859,091 | 11/1958 | Winters | 23—327 X |
| 2,767,046 | 10/1956 | Piros | 23—333 X |
| 2,536,347 | 1/1951 | Brimm et al. | 23—319 X |
| 2,176,609 | 10/1939 | McCormack | 23—320 |

OTHER REFERENCES

Henn et al.: U.S. Bureau of Mines Report of Investigation, No. 7156, July 1968, pp. 1–10.

CARL D. QUARFORTH, Primary Examiner

R. E. SCHAFER, Assistant Examiner

U.S. Cl. X.R.

423—20, 11, 18

UNITED STATES PATENT OFFICE
CERTIFICATE OF CORRECTION

Patent No. 3,740,200  Dated June 19, 1973

Inventor(s) RENE GAUTIER

It is certified that error appears in the above-identified patent and that said Letters Patent are hereby corrected as shown below:

Column 4, Line 44

Change "94.6 kg." to --96.4 kg.--

Signed and sealed this 19th day of November 1974.

(SEAL)
Attest:

McCOY M. GIBSON JR.
Attesting Officer

C. MARSHALL DANN
Commissioner of Patents